ated: 9,179,474 B2
(45) Date of Patent: Nov. 3, 2015

(12) United States Patent
Torsner et al.

(54) COMBINED CONTENTION AND SCHEDULING BASED UPLINK FOR S3G (75) Inventors: Per Johan Torsner, Masaby (FI); Eva Englund, Linköping (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 2386 days.

(21) Appl. No.: 12/064,518

(22) PCT Filed: Aug. 22, 2005

(86) PCT No.: PCT/EP2005/009059
§ 371 (c)(1),
(2), (4) Date: Jul. 8, 2008

(87) PCT Pub. No.: WO2007/022787
PCT Pub. Date: Mar. 1, 2007

(65) Prior Publication Data
US 2008/0318607 A1 Dec. 25, 2008

(51) Int. Cl.
*H04W 72/00* (2009.01)
*H04W 74/02* (2009.01)
*H04W 72/12* (2009.01)
*H04W 74/08* (2009.01)

(52) U.S. Cl.
CPC ............. *H04W 74/02* (2013.01); *H04W 72/12* (2013.01); *H04W 74/08* (2013.01)

(58) Field of Classification Search
USPC .......... 455/422.1, 450–453, 456.2, 464, 509, 455/510; 370/395.41, 332; 375/E7.141
See application file for complete search history.

(56) References Cited

U.S. PATENT DOCUMENTS

| 5,799,018 | A * | 8/1998 | Kanekiyo et al. ............. 370/451 |
| 6,763,248 | B1 * | 7/2004 | Odamura ...................... 455/557 |
| 2003/0056228 | A1 * | 3/2003 | Foster et al. .................. 725/133 |
| 2003/0198205 | A1 * | 10/2003 | Uebayashi et al. ........... 370/335 |
| 2003/0200363 | A1 * | 10/2003 | Futral ............................ 710/23 |
| 2003/0228888 | A1 * | 12/2003 | Adamson ..................... 455/566 |
| 2004/0162083 | A1 * | 8/2004 | Chen et al. ................... 455/454 |
| 2004/0248579 | A1 * | 12/2004 | Fukui et al. .................. 455/450 |
| 2005/0047416 | A1 * | 3/2005 | Heo et al. ................... 370/395.4 |
| 2005/0081246 | A1 * | 4/2005 | Barrett et al. ................ 725/105 |
| 2006/0095582 | A1 * | 5/2006 | Nitya et al. .................. 709/236 |
| 2007/0165575 | A1 * | 7/2007 | Niwano ....................... 370/335 |
| 2008/0076432 | A1 * | 3/2008 | Senarath et al. ............. 455/442 |
| 2009/0016278 | A1 * | 1/2009 | Wakabayashi ............... 370/329 |
| 2010/0020683 | A1 * | 1/2010 | Gummalla et al. .......... 370/230 |

FOREIGN PATENT DOCUMENTS

| EP | 0913970 A | 6/1999 |
| EP | 1037405 A | 9/2000 |

OTHER PUBLICATIONS

Nguyen T et al: "Survey and evaluation of multiple access protocols in multimedia satellite networks" IEEE Proceedings, Apr. 1, 1990, pp. 408-413, XP010007682.

* cited by examiner

*Primary Examiner* — Dominic E Rego (57) ABSTRACT

A communications system comprises a terminal, and network resources. The terminal is operable to transmit substantially simultaneously a data portion and a data transfer request for that data portion to the network resources.

36 Claims, 4 Drawing Sheets

COMBINED CONTENTION AND SCHEDULING BASED UPLINK FOR S3G

The present invention relates to communications systems, and, in particular, to 3G (third generation) networks and evolutions of such networks.

BACKGROUND OF THE INVENTION

Figure 1:
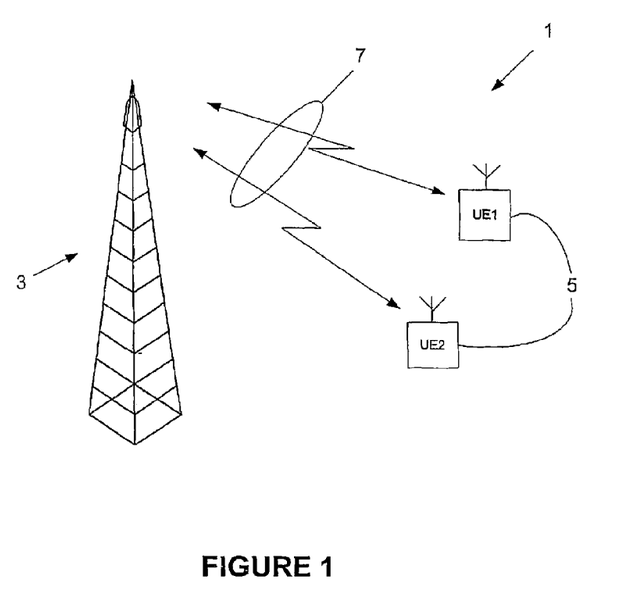
FIG. 1 illustrates part of a wireless telecommunications network.

In wireless radio frequency (RF) communications networks, multiple users communicate using a number of specific radio channels. FIG. 1 of the accompanying drawings illustrates a part of RF communications network 1 that includes network resources 3 which communicate with mobile terminals 5, using an air interface 7. The air interface 7 defines a number of radio channels for enabling transfer of data between the network resources 3 and the mobile terminals 5. Transmissions from the network resources 3 to the user 5 are 'downlink' communications, whilst transmissions from the mobile terminals 5 to the network resources 3 are 'uplink' communications. It will be readily appreciated that the term "network resources" is intended to encompass any suitable equipment in the mobile telecommunications network. For example, the network resources may be provided by a base station, a radio network controller (RNC) a network server, or any combination of these and other units.

When the network supports multiple users, it is necessary to control transmissions on the radio channels to avoid signal and data loss. Downlink transmissions are relatively straightforward to control since the network resources 3 have all relevant information concerning the users which it is serving, and so can control transmissions to the users itself. However, uplink communications are more difficult to control, since an individual user does not have information concerning the other users that are in communication with the network resources 3. It is therefore desirable to provide a technique that controls transmissions by the mobile terminals 5.

A Multiple Access Control (MAC) protocol is such a technique. Desired characteristics of a MAC protocol include low delay and high aggregate throughput or capacity. Previously considered MAC protocols can be divided into two groups: conflict-free, or 'scheduled' protocols, and contention-based protocols. Conflict-free protocols ensure that transmissions do not interfere with one another. With contention-based protocols collisions between transmissions can occur, and principles for resolving such conflicts must be defined.

Conflict-free protocols typically involve some signalling before data is transmitted to ensure that the transmission will not conflict with other transmissions. Although the duration of this signalling phase may be short, the delay may represent large fractions of the total transmission time, especially for transmission of small amounts of data. For large amounts of data the duration of the signalling phase is of less importance. However, since many data transmissions may be short, the signalling delay can be significant. One benefit of conflict-free protocols is that full medium usage can be achieved. This results in a high capacity potential.

Contention-based protocols allow direct transmission attempts, without previous signalling to ensure that the medium is free. This leads to very low delays. However, the risk of collisions between transmission attempts increases as load increases. Such collisions increase possible delays. Collisions also lead to the radio channels being frequency occupied by non-successful transmission attempts, which in turn results in poor aggregate throughput.

For low traffic loads the contention-based protocols generally yield lower delays, whereas for high traffic loads, the conflict-free protocols are better. Recent developments aim at combining the positive properties of both types of schemes by using two modes, i.e. contention-based transmission is used at low load and scheduled transmission is used for high load.

Currently work is ongoing to design the system concepts for a long term evolution of WCDMA (wideband code division multiple access) networks. This work is also referred to as evolved UTRAN, or E-UTRAN. A strong candidate for the air interface in E-UTRAN is Orthogonal Frequency Division Multiple Access (OFDMA) for the downlink and FDMA (frequency division multiple access) with variable bandwidth for the uplink. In the following, reference will be made to OFDMA and E-UTRAN, but these references should not be construed at limiting.

The E-UTRAN uplink is likely to rely mainly on scheduling, i.e. the network allocates certain chunks to each user for uplink data transmission through scheduling grants transmitted in downlink. The network typically base the issued grants on received scheduling requests from the users. That means that a request phase is needed prior to uplink data transmission that creates some delay. Still, some ways to send at least scheduling requests without a prior request will be needed.

SUMMARY OF THE PRESENT INVENTION

In an embodiment of the present invention, the mobile terminal is allowed to send data in a contention based way but simultaneously also sends a scheduling request. If there is a collision on the contention based data channel, the scheduling request is likely to be received and the network can schedule the mobile terminal with minimum scheduling delay. In case there is no collision on the contention based data channel the data is received in the network with a minimum delay.

In one example, there are no contention-based retransmissions; all retransmissions are under control of the scheduler.

In one example, the amount of resources allocated to contention-based transmission can vary over time depending on the system load and is typically reduced when the load is high.

According to one aspect of the present invention, there is provided a method for transmitting data between a terminal and network resources in a communications network, wherein a terminal transmits a data portion substantially simultaneously with a data transfer request relating to the data portion.

According to another aspect of the present invention, there is provided a communications system comprising a terminal; and network resources, wherein the terminal is operable to transmit substantially simultaneously a data portion and a data transfer request for that data portion to the network resources.

In one embodiment of the present invention, a data portion and a data transfer request are transmitted substantially simultaneously from a terminal to network resources, the data transfer request relating to the data portion, if the data portion is not received completely by the network resources, a scheduling message is transmitted from the network resources to the terminal, and the data portion is transmitted from the terminal to the network resources according to a schedule determined by the scheduling message.

In an embodiment of the present invention, the terminal performs contention-based data transmission to the network resources, and, substantially simultaneously, submits a data transfer scheduling request to the network resources.

The data transfer request may include an indication of an amount of data to be transmitted from the terminal. The scheduling message can serve to grant transmission access to the terminal in dependence upon an amount of data received by the network resources, and on the indication of the amount of data to be transmitted in the data transfer request.

The data transfer request may include an indication that an amount of data greater than the data portion is to be transmitted from the terminal.

Resources allocated to the data transfer request, and to transmission of the data portion may be predetermined. Alternatively, the network resources may determine resources allocated to the data transfer request, and to transmission of the data portion. The network resources may indicate to the terminal data portions that can be transmitted without a data transfer request.

The communications network may be a wireless network. In one embodiment, the communications network is a radio frequency network, and the terminal is a mobile terminal.

Other aspects of the present invention provide a terminal and a network that operate in a manner in accordance with the previous aspects of the invention.

DETAILED DESCRIPTION OF THE PREFERRED EMBODIMENTS

FIG. 1 illustrates part of a wireless network which can be utilised in accordance with the present invention. As described above, network resources 3 communicate with mobile terminals 5 over an air interface 7.

Figure 2:
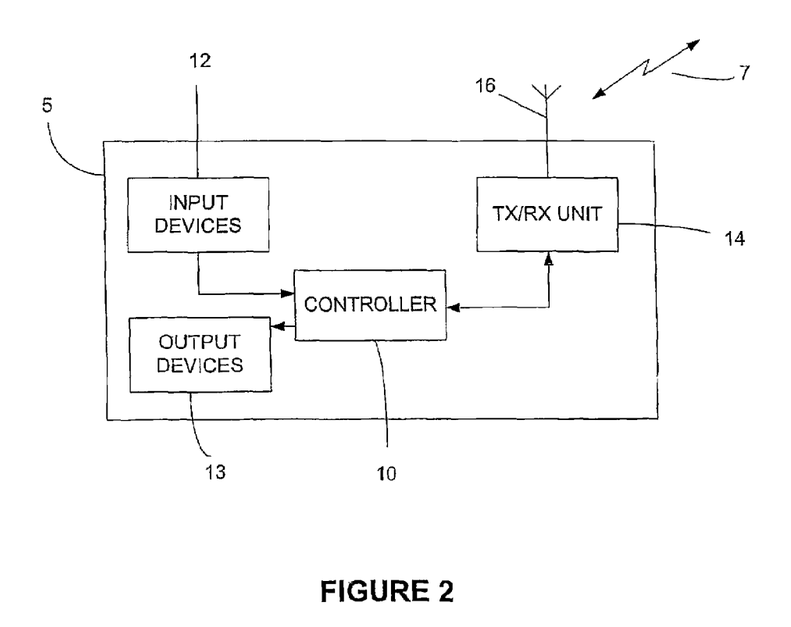
FIG. 2 illustrates mobile terminal used in the network of FIG. 1.

FIG. 2 illustrates a mobile terminal 5, which includes a controller 10 which receives inputs from input devices 12, and supplies data to be transmitted to a transmit/receive (TX/RX) unit 14. The transmit/receive unit 14 transmits data over the air interface 7 via an antenna 16. The transmit/receive unit 14 also receives signals via the antenna 16 and communicates those to the controller 10. The input devices can be a keypad, microphone etc, and the output devices 13 can be a display device and a loudspeaker. As is well known, a user of the mobile terminal 5 supplies voice signals and key inputs to the controller 10 in order to perform voice calls and/or data calls.

The present invention is concerned with uplink transmission of data from a mobile terminal 5 to the network resources 3. In accordance with the present invention, in order to transmit data portions from the mobile terminal 5 to the network resources 3, the mobile terminal makes use of both contention-based techniques and scheduled techniques.

In the following, the term 'chunk' is used to denote the smallest resource allocation that can be assigned to a user. In case of OFDMA (Orthogonal Frequency Division Multiple Access), a chunk corresponds to a set of sub-carriers and a time interval and in case of FDMA (Frequency Division Multiple Access) a chunk would correspond to a frequency and time interval. Different chunks can be reserved for specific usage, for example, broadcast information, user data transmission or scheduling requests.

Figure 3:
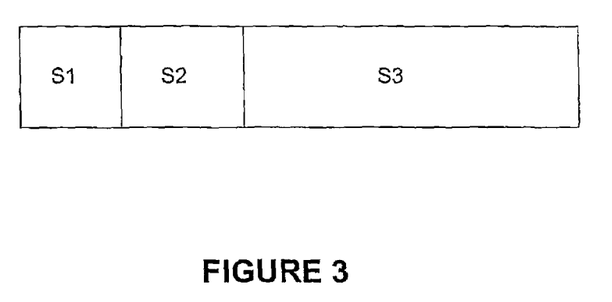
FIGS. 3 and 4 illustrate data structures for use in networks embodying the present invention.

In accordance with embodiments of the present invention, an uplink resource is logically divided into three different sets (S1, S2, S3) (shown schematically in FIG. 3):

S1 is used for scheduling requests.
S2 is used for contention-based data transmission.
S3 is used for scheduled data transmissions.

Data transfer in accordance with the present invention will now be described with reference to FIGS. 1 to 5. When a data portion is to be transmitted by the mobile terminal 5 to the network resources 3, the mobile terminal 5 operates to transmit the data portion in the contention-based set S2. The data portion is sent in set S2 without a valid scheduling message being received by the mobile terminal 5, and so collisions may occur for the set S2 for the data portion. The probability of collision may be relatively high.

In order to mitigate the effects of any collision for the data portion sent in set S2, the mobile terminal send a scheduling request in set S1 (FIG. 5, step B) substantially simultaneously with the data portion in S2. The scheduling request may be subject to a collision, but since the scheduling request is small the probability of collision is low with a reasonable size of set S1.

Figure 5:
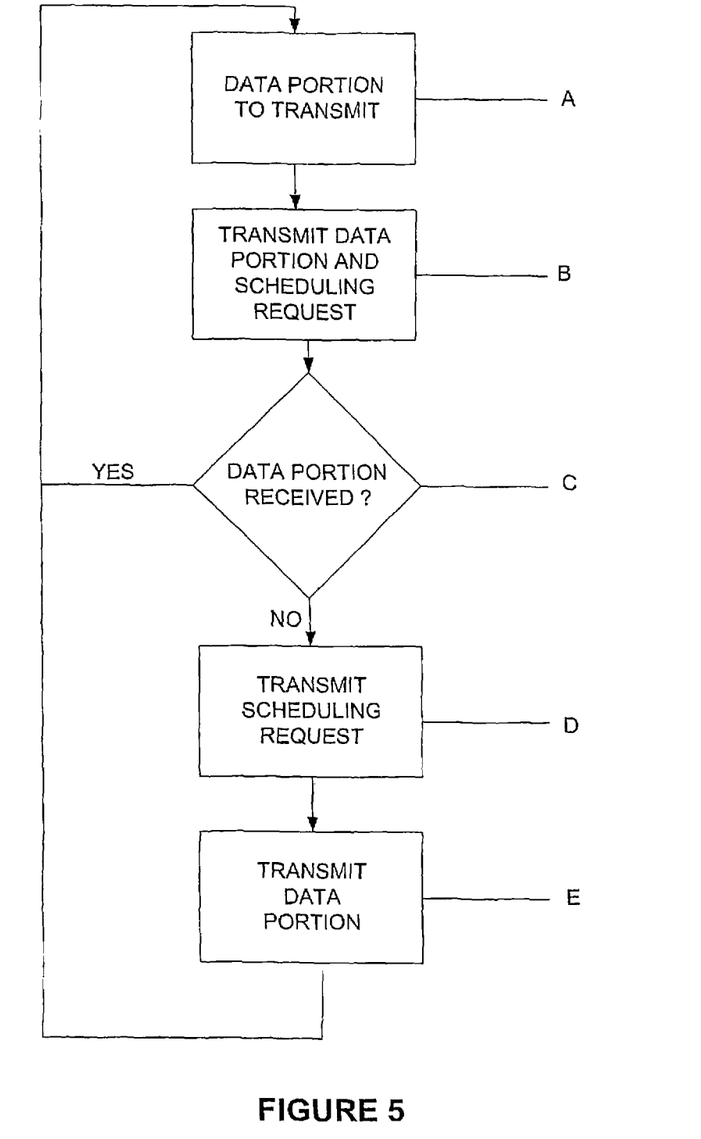
FIG. 5 is a flowchart describing steps in a method embodying another aspect of the present invention.

The network resources 3 determine whether the data portion concerned has been received correctly (step C) and if so, the next data portion can be transmitted.

If the data portion has not been received correctly, then the network resources 3 transmit a scheduling message (step D) to the mobile terminal 5, in order to schedule transmission of the data portion. The mobile terminal 5 is then able to transmit the data portion (step E) in set S3 in dependence upon the information supplied in the scheduling message.

A mobile terminal is only allowed to transmit data in set S3 if a valid scheduling message has been issued to that mobile terminal. The transmissions in set S3 do not experience collisions since scheduling is used (assuming a reasonable scheduling strategy is used).

If there is a collision for the data portion sent in set S2, then the data portion will be scheduled for transmission in set S3 by the network resources. There are no retransmissions on the contention-based set S2 and, so no random back off or other conflict resolution scheme is needed. All retransmissions are under the control of the network resources and use set S3.

The sets S1, S2, and S3 may be overlapping. However, in a preferred embodiment, S1 is orthogonal to both S2 and S3 to ensure that scheduling requests do not interfere with data transmission (and vice versa). In addition, S2 can be orthogonal to S3.

In one embodiment, the scheduling request (sent in S1) may contain explicit information about the amount of data to be transferred from the mobile terminal 5 to the network resources 3. When the network resources receive a data portion in S2 and a corresponding scheduling request in S1, the network resources 3 subtract the amount of correctly received data from the amount of data indicated in the scheduling request, and send a scheduling grant for the remaining amount of data. When the amount of correctly received data is larger than or equal to the amount of data indicated in the scheduling request, the network resources do not send any scheduling message to the mobile terminal, since the data portion is assumed to have been received correctly.

In another embodiment, the scheduling request contains a flag indicating if the data portion to which the scheduling request corresponds contains all of the data to be transferred from the mobile terminal. When the network resources 3 receive the scheduling request and correctly receive some amount of data, the network resources identify from the indicator flag in the scheduling request, whether or not additional data is to be transferred from the mobile terminal. If more data is to be transferred, the network resources send a scheduling message to the mobile terminal in order to allow the remaining data to be sent in a scheduled manner.

In a further embodiment, the scheduling request does not contain any information about the amount of data to be transferred from the mobile terminal. In such an embodiment, the network resources do not have sufficient information to determine whether the mobile terminal has transmitted all of its data or if more data remains to be transferred. The network resources can then send a scheduling message to allow any additional data to be sent in a scheduled manner from the mobile terminal.

In addition to the above mentioned information, the scheduling request may contain additional information to aid the scheduling decision in the network, e.g. priority of the data to be transmitted, Quality of service class or similar.

In a low load situation it can be beneficial to allocate a relatively large amount of resources for contention-based transmissions, i.e. defining a large set S2, since this would allow for low delays when data is transmitted.

Figure 4:
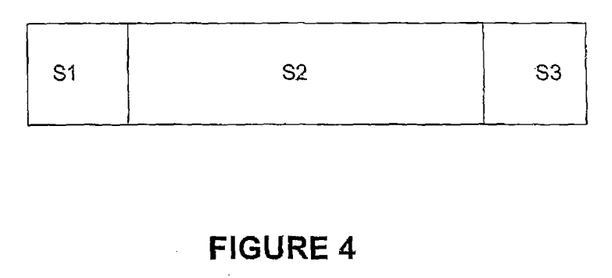

In a high load situation, the contention-based transmissions in S2 would suffer from frequent collisions. Also, the contention-based transmissions in S2 take resources from the scheduled transmissions in S3. It can, therefore, be beneficial in high load situations to allocate a larger part of the resources to scheduled transmissions, by not allowing any contention-based transmission at all, or by only allocating a small amount of resources. Examples of such allocations are illustrated in FIGS. 3 and 4 respectively.

The allocation of resources between the different groups S1, S2, and S3 can be realised in several ways, as will be described below.

The part of the total resources allocated for scheduling requests, S1, can either be specified as part of the standard or signalled by a part of the network resources responsible for the radio resource control.

The division between S2 and S3 can be handled in several ways:

One option is for the network resources 3 to divide semi-statically the available resources between S2 and S3. The division can then be communicated to the mobile terminals. The division can be updated as the traffic load changes, although reallocation of resources between S2 and S3 are likely to be slower than the scheduling decisions for the data traffic. S2 and S3 can either be overlapping or orthogonal. In the former case the network resources must take into account that any scheduled transmission using chunks being part of both S2 and S3 could be interfered with by contention-based transmissions. In the latter case (of S2 and S3 being orthogonal) this problem is avoided.

Another option would be for the network resources 3 to divide the total resources into S2 and S3, such that all mobile terminals in the area for which the network resources are responsible are provided with a transmission grant in advance (without a prior request phase) for the S2 resources. That is, a terminal is provided with some grants in advance (e.g., at call setup or whenever the network so decides) and those grants give the terminal the right to transmit using the S2 resources without a prior request To transmit on S3, the terminal must request for permission using a scheduling request. This is one way of implementing a more 'dynamic' division of resources between S2 and S3, the network can at any time decide to, e.g., allocate more/less resources to S2 by sending new 'in-advance' grants, i.e., using the same signalling mechanism as anyway used for scheduling.

Thus, any terminal with an advance grant can at any time start transmitting on S2. In response to the scheduling request (and the contention based transmission on S2), the scheduler can determine to assign the terminal a grant using S3 for the remaining part of the packet and/or to revoke the advance grants for other terminals in the cell. Note that the terminal should only transmit a scheduling request along with the data transmission for the initial transmission using S2, nor for subsequent (scheduled transmissions on S3). Hence, the terminal behaviour could be slightly different depending on whether an 'advance' grant is used or a grant received in response to a scheduling request.

The terminal may also keep the network updated about its status, e.g., remaining data in the buffers, during a scheduled transmission by incorporating this information in the normal data stream as a header. Thus, the network could schedule the UE to transmit using S3 for a long period of time and by observing the status of the terminal decide whether is should reallocate resources to the terminal.

Embodiments of the invention make it possible to combine the properties of scheduled transmission and contention-based transmission. Such combination gives the following advantages:

Initial transmissions can be done immediately without waiting for a scheduling message.

Small amounts of data can be sent with low delay without scheduling.

In case of collisions the user will automatically be scheduled, i.e. no back off mechanism creating delay is needed.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The words "comprising" and "comprises", and the like, do not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer, if appropriate. In a claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for transmitting data between a terminal and network resources in a communications network, wherein the method comprises:

receiving a data portion and a data transfer scheduling request transmitted concurrently by a terminal, the data transfer scheduling request relating to said data portion;

transmitting a scheduling message to the terminal if the data portion is not received completely by the network resources; and receiving the data portion from the terminal according to a schedule determined by the scheduling message.

2. A method as claimed in claim 1, further comprising the steps of:

transmitting a data portion and a data transfer scheduling request substantially simultaneously to network resources, the data transfer scheduling request relating to the data portion;

if the data portion is not received completely by the network resources, receiving a scheduling message, and transmitting the data portion to the network resources according to a schedule determined by the scheduling message.

3. A method as claimed in claim 1, wherein the data transfer scheduling request includes an indication of an amount of data to be transmitted from the terminal.

4. A method as claimed in claim 3, wherein the scheduling message serves to grant transmission access to the terminal in dependence upon an amount of data received by the network resources, and on the indication of the amount of data to be transmitted in the data transfer scheduling request.

5. A method as claimed in claim 1, wherein the data transfer scheduling request includes an indication that an amount of data greater than the data portion is to be transmitted from the terminal.

6. A method as claimed in claim 1, wherein resources allocated to the data transfer scheduling request, and to transmission of the data portion are predetermined.

7. A method as claimed in claim 1, wherein resources allocated to the data transfer scheduling request, and to transmission of the data portion are determined by the network resources.

8. A method as claimed in claim 1, wherein the network resources indicate to the terminal resources over which data portions that can be transmitted without a data transfer scheduling request.

9. A method as claimed in claim 1, wherein the communications network is a Wireless network.

10. A method as claimed in claim 9, wherein the communications network is a radio frequency network, and the terminal is a mobile terminal.

11. A communications system comprising:
a terminal; and
network resources wherein the terminal is operable to:
transmit a data portion to the network resources concurrently with a data transfer scheduling request relating to the data portion;
receive a scheduling message transmitted by the network resources indicating that the data portion was not received completely by the network resources; and
transmit the data portion to the network resources according to a schedule determined by the scheduling message.

12. A system as claimed in claim 11, wherein the network resources are operable to transmit a scheduling message to the terminal, if the data portion is not received completely by the network resources, and the terminal is operable to transmit the data portion to the network resources according to a schedule determined by a scheduling message.

13. A system as claimed in claim 12, wherein the data transfer scheduling request includes an indication that an amount of data greater than the data portion is to be transmitted from the terminal.

14. A system as claimed in claim 12, wherein the network resources are operable to indicate to the terminal resources over which data portions that can be transmitted without a data transfer scheduling request.

15. A system as claimed in claim 11, wherein the network resources are operable to receive a data portion transmission and a data transfer scheduling request transmitted substantially simultaneously from the terminal, the data transfer scheduling request relating to the data portion to transmit if the data portion is not received completely, a scheduling message to the terminal, and to receive that data portion from the terminal according to a schedule determined by the scheduling message.

16. A system as claimed in claim 11, wherein the data transfer scheduling request includes an indication of an amount of data to be transmitted from the terminal.

17. A system as claimed in claim 16, wherein the scheduling message serves to grant transmission access to the terminal in dependence upon an amount of data received by the network resources, and on the indication of the amount of data to be transmitted in the data transfer scheduling request.

18. A system as claimed in claim 11, wherein resources allocated to the data transfer scheduling request and to transmission of the data portion are predetermined.

19. A system as claimed in claim 11, wherein resources allocated to the data transfer scheduling request, and to transmission of the data portion are determined by the network resources.

20. A system as claimed in claim 11, being a wireless network.

21. A system as claimed in claim 20, wherein the wireless network is a radio frequency network, and the terminal is a mobile terminal.

22. A terminal for a communications system, operable to:
transmit a data portion to the network resources concurrently with submit a data transfer scheduling request relating to the data portion;
receive a scheduling message transmitted by the network resources indicating that the data portion was not received completely by the network resources; and
transmit the data portion to the network resources according to a schedule determined by the scheduling message.

23. A terminal as claimed in claim 22, wherein the data transfer scheduling request includes an indication of an amount of data to be transmitted from the terminal.

24. A terminal as claimed in claim 22, wherein the data transfer scheduling request includes an indication that an amount of data greater than the data portion is to be transmitted from the terminal.

25. A terminal as claimed in claim 22, wherein the communications system is a radio frequency wireless network, the terminal being a mobile terminal.

26. An apparatus for communicating with terminals via a contention-based data transmission, the apparatus operable to:
receive a data portion and a data transfer scheduling request relating to the data portion transmitted concurrently from a terminal;
transmit a scheduling message to the terminal, if the data portion is not received completely; and
receive the data portion according to a schedule determined by said scheduling message.

27. An apparatus as claimed in claim 26, wherein the data transfer scheduling request includes an indication of an amount of data to be transmitted from the terminal.

28. An apparatus as claimed in claim 27, wherein the scheduling message serves to grant transmission access to the terminal in dependence upon an amount of data received by the network resources, and on the indication of the amount of data to be transmitted in the data transfer scheduling request.

29. An apparatus as claimed in claim 26, the apparatus being configured to operate in a wireless network.

30. An apparatus as claimed in claim 29, wherein the wireless network is a radio frequency network, and the terminal is a mobile terminal.

31. A method for communicating with resources of a telecommunication network, the method comprising:
- transmitting a data portion to network resources concurrently with a data transfer scheduling request relating to the data portion;
- receiving a scheduling message transmitted by the network resources indicating that the data portion was not received completely by the network resources; and
- transmitting the data portion to the network resources according to a schedule determined by the scheduling message.

32. A method as claimed in claim 21, wherein the data transfer scheduling request includes an indication of an amount of data to be transmitted by the terminal.

33. A method as claimed in claim 32, wherein the scheduling message serves to grant transmission access to the terminal in dependence upon an amount of data received by the network resources, and on the indication of the amount of data to be transmitted in the data transfer scheduling request.

34. A method as claimed in claim 31, wherein the data transfer scheduling request includes an indication that an amount of data greater than the data portion is to be transmitted from the terminal.

35. A method as claimed in claim 31, wherein transmitting the data portion and the data transfer scheduling request comprises wirelessly transmitting the scheduling message.

36. A method as claimed in claim 35, wherein wirelessly transmitting the scheduling message comprises transmitting the scheduling message to a mobile terminal operating in a radio frequency network.

* * * * *

UNITED STATES PATENT AND TRADEMARK OFFICE
CERTIFICATE OF CORRECTION

| | | |
|---|---|---|
| PATENT NO. | : 9,179,474 B2 | Page 1 of 1 |
| APPLICATION NO. | : 12/064518 | |
| DATED | : November 3, 2015 | |
| INVENTOR(S) | : Torsner et al. | |

It is certified that error appears in the above-identified patent and that said Letters Patent is hereby corrected as shown below:

In The Specification

In Column 1, Lines 18-19, delete "user 5" and insert -- user --, therefor.

In Column 6, Line 18, delete "is should" and insert -- it should --, therefor.

In The Claims

In Column 8, Line 27, in Claim 22, delete "submit a" and insert -- a --, therefor.

In Column 9, Line 12, in Claim 32, delete "claim 21," and insert -- claim 31, --, therefor.

Signed and Sealed this
Fifteenth Day of March, 2016

Michelle K. Lee
*Director of the United States Patent and Trademark Office*